Nov. 28, 1967  W. B. WHIPPO ET AL  3,355,099
SPRING DETENT
Filed March 21, 1966  2 Sheets-Sheet 1
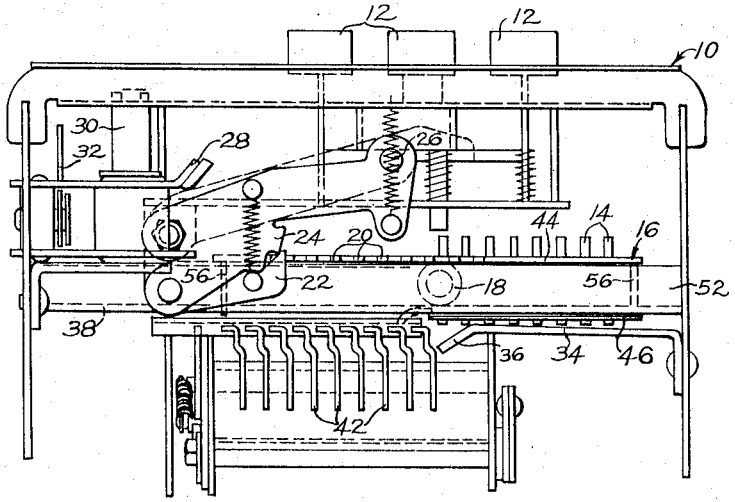
FIG. 1
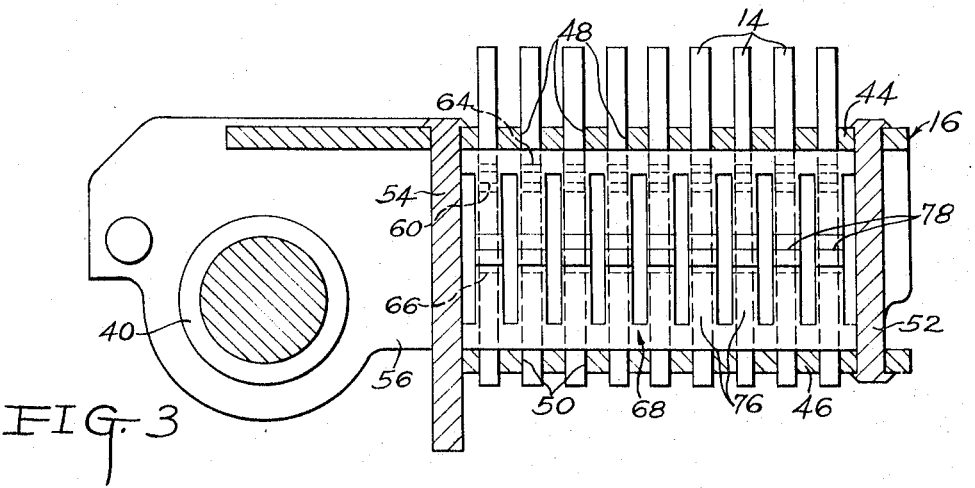
FIG. 3
FIG. 4
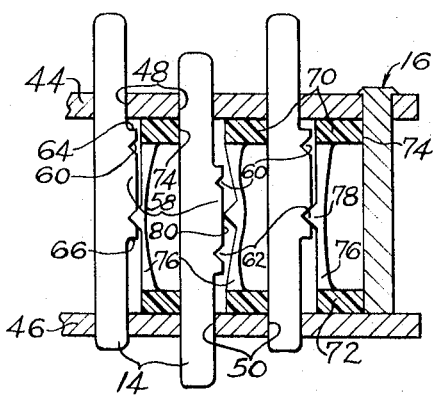
Inventors:
Walter B. Whippo, Kenneth L. Bick
Chester Brown
Gradolph, Love & Rogers
Attorneys Inventors:
Walter B. Whippo, Kenneth L. Bick
Chester Brown
Gradolph, Love & Rogers
Attorneys United States Patent Office 3,355,099
Patented Nov. 28, 1967

3,355,099
SPRING DETENT
Walter B. Whippo, Park Ridge, Kenneth L. Bick, Morton Grove, and Chester Brown, Chicago, Ill., assignors to Victor Comptometer Corporation, Chicago, Ill., a corporation of Illinois
Filed Mar. 21, 1966, Ser. No. 536,142
10 Claims. (Cl. 235—60)

ABSTRACT OF THE DISCLOSURE

The spring detent of unitary construction made from a solid resilient synthetic resinous material highly resistant to abrasion, such as elastomeric polyurethane, solid polypropylene, and polyvinyl chloride, has two anchoring portions made of heavy cross section in a transverse direction joined by a web portion which is substantially thinner than the anchoring portions in the same transverse direction, and a detent element projecting outwardly from the plane of the web portion intermediate its ends and adapted to engage and retain a movable member adjacent thereto. The web portion may comprise a plurality of spaced narrow ribbon-like webs or be a single web substantially coextensive with the longitudinal extent of the two anchoring portions. The spring detent is particularly useful in a pin carriage of a ten key adding calculating machine. The pin carriage is a box having spaced, but connected, top and bottom plates provided with aligned rectangular patterns of noncircular holes through which a plurality of stop pins slidably project, each stop pin having a lateral projection along one edge thereof to engage the detent element of the adjacent spring detent. A spring detent is inserted in the box adjacent each row of pins, with its detent element in the path of movement of the lateral extension on the pin.

---

The present invention relates to improvements in spring detents.

Spring detents have many uses, not the least of which is temporarily retaining a longitudinally, axially, or rotatably movable element in a set position from which it may be advanced or restored to its original position. It has been customary to make these detents of metal of such characteristics and composition as to withstand flexing hundreds of thousands of times. However, all metals have a fatigue point, and when this point is exceeded the detent fails. Failure may also occur from other causes. This failure, and the replacement of the defective part, may be costly in time and money and may also be inconvenient when the detent is mounted in an inaccessible position in the machine or apparatus.

One particular installation of a detent of this character is in the pin carriage of a ten key adding or calculating machine of the type shown in Thomas O. Mehan Patent No. 2,486,959, dated Nov. 1, 1949, particularly FIGS. 11, 12, and 13 thereof. The pin carriage moves laterally in such machines and carries a rectangularly arranged regular pattern of stop pins which are intended to be depressed by the stems of the number keys on the keyboard during entry of an amount into the machine. The depressed pins lie in the movement paths of the actuator slides or racks to limit their movement when the machine is cycled, thereby to enter the amount into the accumulator or register or other storage devic in the machine. The depressed pins are retained in their depressed positions by spring detents, and they are restored to their original positions at the end of the machine cycle so as to be held by the spring detents until the next machine operation. There are ordinarily nine stop pins and nine detents for each arithmetic machine column. The machine that totals 12 columns has 108 detents. Should one of these break, wear out, or refuse to function in the manner intended, the pin carriage must be removed and replaced or repaired, which is a major service operation.

It has been customary to make the spring detents in comb form as shown in the aforesaid patent, and of Phosphor bronze which has good resilient characteristics. The stop pins are ordinarily made in a stamping operation and the surface thereof against which the spring detent bears is not polished or exceedingly smooth, but contrarily may have tiny burrs or rough spots. These abrade the spring detent and eventually it is worn through or is worn so thin that it breaks.

The inventors hereof have found that solid flexible or elastomeric polyurethane has certain physical characteristics which make it exceptionally suitable for use in the manufacture of spring detents. It is solid and resilient and returns to original shape immediately upon release from flexed or deformed position. It may be flexed as often, or oftener, than metals. And it is surprisingly resistant to abrasion so that it has a longer life than Phosphor bronze as a spring detent in a pin carriage. This particular material is to be distinguished from the foamed or cellular urethanes, some of which may also be flexible. Other plastic materials tested and found to have some of the characteristics of the elastomeric polyurethane are solid polypropylene and polyvinyl chloride. These do not have abrasion resistance characteristics as high as elastomeric polyurethane, but may be acceptable as spring detent material in some instances.

Spring detents of these plastic materials may be fabricated into a substantially sturdy unit wherein a group of detents may be accommodated in a unitary structure. While attempts have been made with reasonable success in fabricating a unitary multiple detent device of metal, it has not been unusual for the spring detents to fail leaf by leaf or finger by finger. It also appears that these resilient plastic or synthetic materials are capable of local flexing to a far greater extent than metal, and thus a simple detent structure can be made to retain a number of movable elements.

It is therefore a principal object of the present invention to provide a new and improved spring detent made of a long life plastic or synthetic material having highly resilient physical characteristics and resistance to abrasion, which is formed with an element engaging a member to be retained in a desired normal or advanced position.

Another object is to provide a new and improved spring detent made of unitary construction and of a resilient plastic or synthetic material having the foregoing characteristics, and adapted to engage a plurality of elements to be retained in normal or advanced positions.

Another object is to provide a new and improved spring detent having a plurality of detent elements incorporated into a unitary structure, each of which is adapted to engage a different element to be retained in normal or advanced position, the structure being made of a resilient plastic or synthetic material having the foregoing characteristics.

Another object is to provide a new and improved spring detent having at its lateral edges means for anchoring the structure, and having additional means engageable with a plurality of elements for retaining them in an advanced or normal position, such structure being made of a resilient plastic or synthetic material having the foregoing characteristics.

Another object is to provide a new and improved spring detent meeting the foregoing objectives, made from a class of plastic or synthetic materials, including the following: solid flexible or elastomeric polyurethane, polypropylene, and polyvinyl chloride.

Other objects and advantages will become apparent from the following descriptions taken in conjunction with the accompanying drawings, wherein—

FIG. 1 is an elevational view through the keyboard and immediately associated mechanism, including a pin carriage, of a ten key adding or calculating machine in which spring detents of the present invention are installed;

FIG. 3 is a transverse sectional view taken along the line 3—3 of FIG. 2, looking in the direction of the arrows, illustrating the spring detent of the present invention with all of the illustrated pins in normal position;

FIG. 4 is a fragmentary sectional view similar to FIG. 3, showing one of the pins partially depressed and in a position not to be restrained against movement in either direction;

Figure 2:
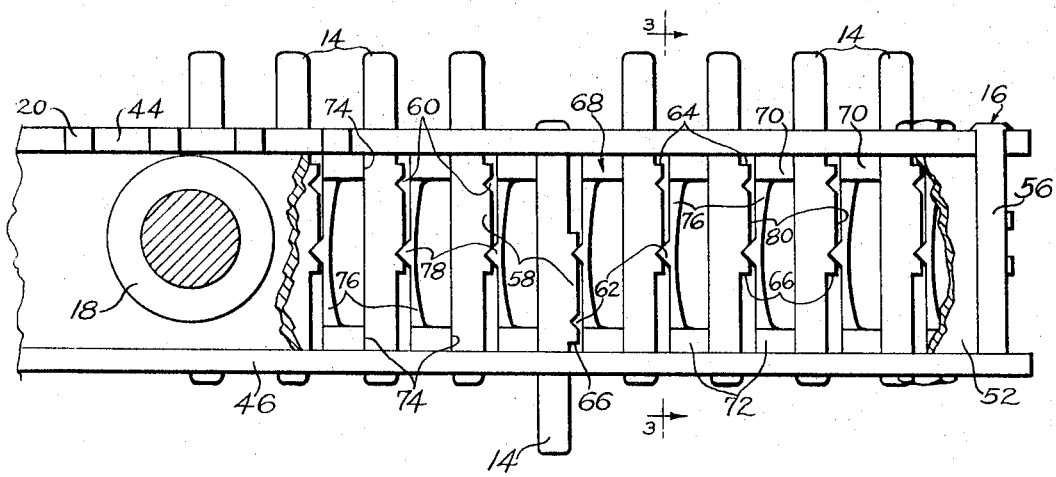
FIG. 2 is a fragmentary enlarged elevational view, partly broken away, of a portion of the pin carriage shown in FIG. 1, illustrating the spring detents of the present invention associated with the stop pins, with one pin depressed.
Figure 5:
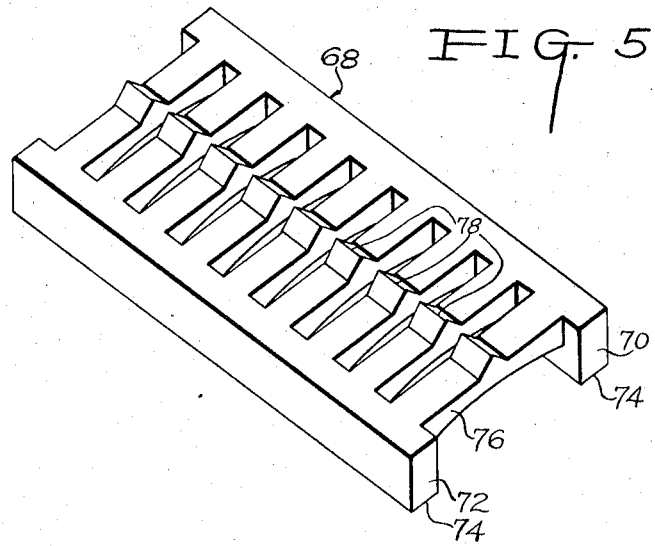
FIG. 5 is a perspective view of one form of spring detent of the present invention.

The spring detent of the present invention has been illustrated and is described with respect to a pin carriage customarily used in ten key adding and calculating machines. However, it is intended that this be illustrative only, and that no limitations with respect to the invention are to be construed from the illustrated and described use, except as set forth in the claims.

In FIG. 1 there is shown a fragment of a conventional ten key adding or calculating machine having a keyboard 10, manually depressible numeral entering keys 12 which have stems to operate certain linkages for the purpose of depressing appropriate stop pins 14 in a pin carriage 16. The pin carriage is biased leftwardly by a spring (not shown) and moves on a roller 18 and appropriate tracks as more fully explained in the foregoing patent. The pin carriage 16 includes escapement rack teeth 20 which are engaged by an escapement pawl 22 which is pushed out of the path of engagement with the rack teeth by a dog 24 upon each operation of one of the keys 12. The keys are arranged to depress a bail rod 26 which in turn depresses the dog 24 and the pawl 22, the arrangement being such that the dog permits the movement of the pin carriage 16 leftwardly the distance of one tooth 20. The teeth 20 are spaced apart the same distance as are the rows of pins 14 each of which corresponds to one column built into the machine for totaling purposes. It will be noted from FIG. 3 that there are nine stop pins 14 for each column inasmuch as the zeros in the significant figures are automatically entered into the machine in a well known manner.

The pin carriage 16 may be restored rightwardly in the machine either manually or by the cycling of the adding or calculating machine. A linkage indicated generally by the reference character 28 is pivotally mounted on a post 30 and is actuated from a key or slider (not shown) projecting through to the upper side of the keyboard 10. When this key or slider is moved, the linkage 28, which has a portion connected to the pin carriage 16, is pivoted about the post and the pin carriage is moved rightwardly in the machine. This may be done for the purpose of clearing the pin carriage of any depressed pins when an error in the entered amount has been made, for example. The linkage 28 is also connected by a long link 32 running rearwardly of the machine to a mechanism which is operated on each cycle of the machine for the purpose of resetting the pin carriage upon every normal machine cycle. The link 32 is connected to appropriate cams and the like (not shown) and in a manner well known in this art to be operated from the main shaft of the machine.

As the pin carriage 16 is restored, the stop pins 14 are returned to their normal position by means of a pin reset plate 34 having an entering camming portion 36 which is so located and formed as not to interfere with the normal operation of the pin carriage in the resetting direction.

In addition to the roller 18, the pin carriage is guided by and moves on a cross rod 38 which extends through suitable bearing sleeves 40 in the pin carriage.

During the normal machine cycle, the set pins engage and stop rearwardly, moving actuator slides or rack bars 42. This function, and its purpose, are well known in the art and will not be described in greater detail. Reference may be had to the previously mentioned patent for a typical installation and operation.

The pin carriage structure is best seen in FIGS. 2 and 3, and it comprises a top plate 44 and a bottom plate 46, each having a pattern of rectangular apertures 48 and 50, respectively, through which the stop pins slidably extend for engagement by the amount entering keys 12 and associated mechanism, and for engaging with the actuator slides or rack bars 42. The pins and apertures are rectangular in cross section so that the pins will not rotate in the pin carriage.

The plates 44 and 46 are separated by a front plate 52 and a rear plate 54 which are staked to the outside surfaces of the top and bottom plates, thus insuring first that they are separated, second, that they are held in appropriate positions relative to each other, and third, that a rigid structure is provided. The external structure is completed by a pair of side plates 56 similarly staked to and separating the top and bottom plates, with the side plates having a rearward extensions which carry the bearing sleeves 40 to mount the pin carriage on the cross rod 38.

Each of the stop pins 14 is formed with a lateral extension 58 which projects a very slight distance from the edge of the pin, and which has a pair of vertically spaced notches 60, 62 therein. The lateral extension 58 presents a pair of shoulders 64, 66 which limit the extent of the vertical movement of the stop pins 14 against the inner faces of the top and bottom plates 44, 46, respectively, thereby preventing the pins from becoming dislodged from the confines of the box formed by the top and bottom plates, the front and rear plates, and the side plates.

The stop pins are arranged in spaced parallel rows with each row corresponding to a column used in the totaling operation. Facing the stop pins 14 on their edges, wherein the lateral extension 58 projects, are spring detent structures 68. Each of these structures comprises at its upper and lower end a relatively solid anchoring flange 70, 72, respectively, the flange 70 being adapted to abut against the under face of the top plate 44 and the bottom flange 72 abutting against the inner and upper face of the bottom plate 46. The exterior surfaces 74 of the flanges ride against the backs of the adjacent stop pins 14 except in the case of the most rightward of the structures 68, wherein it abuts against the inner face of the end plate 56.

Interconnecting the flanges 70, 72 are a plurality of flexible narrow webs 76 which at their midpoints are formed with a V-shaped detent element 78. The detent element 78 is adapted to engage in the notches 60 and 62, depending upon whether the stop pin 14 is in its retracted or normal position or in its depressed position after having been moved by one of the amount entering keys 12 and the associated linkage.

The structure is such that due to the physical characteristics of the synthetic plastic material of which the detent structure is made, the detent elements 78 freely engage and retain the stop pin 14 in either of its adjusted extreme positions. As previously noted herein, the synthetic resinous material must be flexible and quickly return to its unstressed condition. It must be highly resistant to abrasion so as to withstand the constant sliding engagement of the stop pins. It has been found that solid flexible or elastomeric polyurethane meets these qualifications. To a lesser extent and in other environments solid polypropylene and polyvinyl chloride are acceptable.

The flexure of the web 76 is such that when the tip of the detent element 78 rides on the face 80 of the lateral extension 58, it has a movement restraining effect thereon so that a positive action against the pin 14 in either the downward or upward direction is required in order to move the pin so that one or the other of the notches or recesses 60, 62 is engaged by the detent element 78. This insures that no jarring of the machine would be sufficient to inadvertently drop a stop pin 14 from its normal or retracted position wherein the detent element 78 is in engagement with the recess 62 to the lower position wherein the detent element 78 would be engaged in the recess 60 to enter a false amount into the adding machine.

Figure 6:
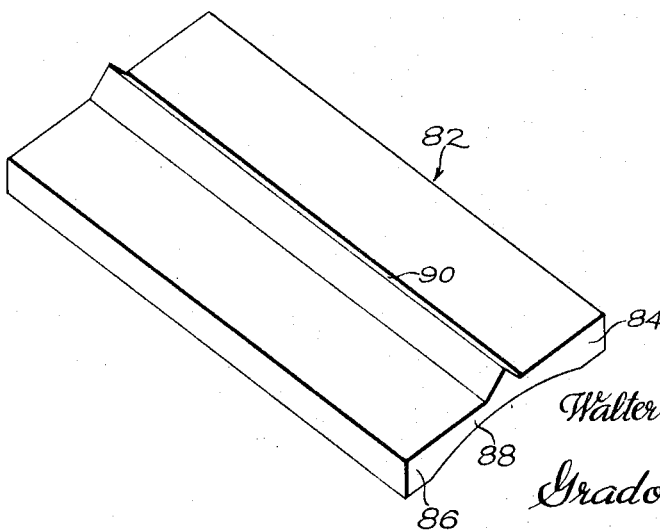
FIG. 6 is a perspective view, similar to FIG. 5, showing a modified form of structure wherein a spring detent has a single restraining element adapted to be engaged by a plurality of settable elements.

FIG. 6 shows a modified detent structure 82 which may be described as monolithic. In this form the structure 82 has thickened upper and lower anchoring portions 84 and 86 which correspond to the upper and lower flanges 70, 72 of the structure 68. Between these thickened anchoring portions is a flexible web 88 which runs the entire length of the structure and thus extends between the front and back plates 52, 54 of the pin carriage 16, and it bears at its midpoint a triangular shape detent element 90 which is also coextensive with the flexible web 88 and the entire structure 82. The characteristic of the synthetic resinous material, elastomeric polyurethane, is such, however, that the web 88 is capable of flexing locally as is the detent element or rib, and consequently when one stop pin 14 per column is depressed by an amount entering key 12 and the associated linkage, the rib 90 and the web 88 are locally deformed to permit the pin to move. Thus, the structure does not permit more than one of the stop pins 14 to move from its adjusted position at any one time.

It will be observed also that this structure 82 serves the same function as the structure 68.

From the foregoing description it will be appreciated that the objectives which were set forth for this invention at the outset of the specification are fully attained by the structure described.

While there has been shown and described preferred embodiments of the invention, it will be apparent that numerous variations and modifications thereof may be made without departing from the underlying principles of the invention. It is intended, therefore, by the following claims, to include within the scope of the invention all such variations and modifications by which substantially the results of the invention may be obtained through the use of substantially the same or equivalent means.

The invention claimed is:

1. A spring detent of unitary construction having two spaced first portions of heavy cross section in a first transverse direction, said first portion being adapted to be anchored, a second portion of substantially thinner cross section in said same transverse direction extending between said two first portions and being resilient, and a detent element projecting outwardly away from the plane of said second portion intermediate its ends and adapted to engage and retain a movable member adjacent thereto, said detent being made of a solid, resilient synthetic resinous material which is highly resistant to abrasion.

2. A spring detent as claimed in claim 1, wherein said second portion comprises a plurality of spaced, narrow, ribbonlike webs.

3. A spring detent as claimed in claim 1, wherein said second portion comprises a single web substantially coextensive with said first anchoring portions, and said detent element comprises a rib extending the length of said web.

4. A spring detent as claimed in claim 1, wherein said resinous material is elastomeric polyurethane.

5. A spring detent as claimed in claim 1, wherein said resinous material is solid polypropylene.

6. A spring detent as claimed in claim 1, wherein said resinous material is polyvinyl chloride.

7. A pin carriage for adding and calculating machines and the like comprising in combination a box having parallel spaced top and bottom plates each provided with a rectangular pattern of noncircular holes, the holes in said plates being aligned, a plurality of stop pins slidably projecting through said holes, each stop pin having a lateral extension along one edge, said extension being formed with spaced notches, said holes and pins being arranged in parallel rows with said extensions and notches being faced in the same direction, and a spring detent of unitary construction positioned adjacent each row of pins to engage said lateral extensions, said detent having upper and lower spaced anchoring elements of heavy cross section in a first transverse direction and abutted against the inner faces of said top and bottom plates respectively, a flexible portion of substantially thinner cross section in said same transverse direction interconnecting said anchoring elements, and a detent element projecting outwardly away from the plane of said flexible portion intermediate said anchoring elements and bearing against the face of said lateral extension and engageable in said notches to retain the engaged pin in either of its extreme positions, said detent being made of a solid, resilient synthetic resinous material which is highly resistant to abrasion.

8. A pin carriage as claimed in claim 7, wherein said flexible portion of said spring detent comprises a plurality of spaced, narrow, ribbonlike webs.

9. A pin carriage as claimed in claim 7, wherein said flexible portion comprises a single web substantially coextensive with said anchoring elements, and said detent element comprises a rib extending the length of said rib and engaging all of said pins in a row of pins.

10. A pin carriage as claimed in claim 7, wherein said resinous material is elastomeric polyurethane.

References Cited

UNITED STATES PATENTS

| | | | |
|---|---|---|---|
| 2,988,274 | 6/1961 | Carlsen et al. | 235—73 |
| 3,095,143 | 6/1963 | Oldenburg et al. | 235—60 |
| 3,156,411 | 11/1964 | McEvoy | 235—60 |
| 3,161,353 | 12/1964 | Dombrowski | 235—60 |

STEPHEN J. TOMSKY, *Primary Examiner.*